(12) United States Patent
Liu

(10) Patent No.: US 11,644,404 B2
(45) Date of Patent: May 9, 2023

(54) METHOD FOR THE DETERMINATION OF PARTICLE SIZE BIMODALITY

(71) Applicant: Univation Technologies, LLC, Houston, TX (US)

(72) Inventor: Zhenshuo Bobby Liu, Freeport, TX (US)

(73) Assignee: Univation Technologies, LLC, Houston, TX (US)

( * ) Notice: Subject to any disclaimer, the term of this patent is extended or adjusted under 35 U.S.C. 154(b) by 309 days.

(21) Appl. No.: 16/756,228

(22) PCT Filed: Oct. 9, 2018

(86) PCT No.: PCT/US2018/055026
§ 371 (c)(1),
(2) Date: Apr. 15, 2020

(87) PCT Pub. No.: WO2019/079068
PCT Pub. Date: Apr. 25, 2019

(65) Prior Publication Data
US 2020/0240892 A1    Jul. 30, 2020

Related U.S. Application Data

(60) Provisional application No. 62/574,261, filed on Oct. 19, 2017.

(51) Int. Cl.
*C08F 4/00* (2006.01)
*G01N 15/02* (2006.01)

(52) U.S. Cl.
CPC ............ *G01N 15/0211* (2013.01); *C08F 4/00* (2013.01); *G01N 2015/0294* (2013.01)

(58) Field of Classification Search
CPC ...... C08F 4/00; G01N 15/0272; G01N 15/02; G01N 2015/0288; G01N 2015/0277
See application file for complete search history.

(56) References Cited

U.S. PATENT DOCUMENTS

| | | | |
|---|---|---|---|
| 7,719,682 B2 | 5/2010 | Chamberlin et al. | |
| 2009/0124745 A1 | 5/2009 | Nover et al. | |
| 2009/0219528 A1 | 9/2009 | Chamberlin et al. | |
| 2009/0222218 A1 | 9/2009 | Chamberlin et al. | |
| 2010/0169038 A1 | 7/2010 | Georgakis et al. | |
| 2010/0292073 A1* | 11/2010 | Quinones | B01J 35/023 502/208 |
| 2012/0016084 A1* | 1/2012 | Dairoku | C08J 3/245 526/89 |
| 2012/0178888 A1 | 7/2012 | Jorgensen et al. | |

(Continued)

FOREIGN PATENT DOCUMENTS

| | | |
|---|---|---|
| JP | H0459676 A | 2/1992 |
| JP | 2878406 | 4/1999 |

OTHER PUBLICATIONS

Paulino, Studies in Surface Science and Catalysis, 130, (2000) p. 929-934 (Year: 2000).*

(Continued)

*Primary Examiner* — Robert C Boyle
(74) *Attorney, Agent, or Firm* — Brooks, Cameron & Huebsch, PLLC

(57) ABSTRACT

An improved method of characterizing the PSD of particles.

7 Claims, 6 Drawing Sheets

(56) References Cited

U.S. PATENT DOCUMENTS

2014/0037490 A1* 2/2014 Wusatowska-Sarnek .................. B22F 3/24
                                                                    75/228
2017/0133674 A1   5/2017 Murphy et al.

OTHER PUBLICATIONS

International Preliminary Report on Patentability for related PCT Application PCT/US2018/055026, dated Apr. 30, 2020 (8 pgs).
International Search Report & Written Opinion for related PCT Application PCT/US2018/055026, dated Jan. 23, 2019 (21 pgs).
Wikiedia; "Multimodal Distribution"; https://en.wikipedia.org/wiki/Multimodal_distribution, Nov. 5, 2015 (14 pgs).
Knapp, "Bimodality Revisited"; Journal of Modern Applied Statistical Methods, vol. 6, No. 1, Jan. 1, 2007 (14 pgs).

* cited by examiner

METHOD FOR THE DETERMINATION OF PARTICLE SIZE BIMODALITY

This application is a National Stage Application under 35 U.S.C. § 371 of International Application Number PCT/US2018/055026, filed Oct. 9, 2018 and published as WO 2019/079068 on Apr. 25, 2019, which claims the benefit to U.S. Provisional Application 62/574,261, filed Oct. 19, 2017, the entire contents of which are incorporated herein by reference in its entirety.

FIELD OF THE DISCLOSURE

The present disclosure relates generally to particle size measurement and characterization. More specifically, but without limitation, the disclosure relates to particle size measurement and characterization of solid phase particles.

BACKGROUND

Catalysis is pervasive. Catalysts are used in a large number, and possibly the majority, of industrial scale reaction processes. It is recognized that reactive chemistry, and particularly catalysis, i.e. the manufacture and use of catalysts, is relatively unpredictable compared to other fields of endeavor.

The UNIPOL process is the first gas-phase process in the world to have succeeded to manufacturing polyethylene in a variety of the range from LLDPE to HDPE. About 150 polyethylene and polypropylene production lines using gas-phase technology related to the UNIPOL process are currently serving the needs of the world's polyolefin industry. This process is catalytic. A variety of catalysts can be employed to produce a variety or polyolefin products.

WO 2006/023057 discloses a Ziegler-Natta procatalyst composition in the form of solid particles and comprising magnesium, halide and transition metal moieties, said particles having an average size (D50) of from 10 to 70 microns, characterized in that at least 5 percent of the particles have internal void volume substantially or fully enclosed by a monolithic surface layer (shell), said layer being characterized by an average shell thickness/particle size ratio (Thickness Ratio) determined by SEM techniques for particles having a particle size greater than 30 microns of greater than 0.2. WO 2006/023057 teaches that successful a catalyst composition should be based on a procatalyst particle having good mechanical properties including resistance to wear, abrasion and shattering during the ethylene polymerization process, thereby imparting good bulk density and uniformity to the resulting polymer product. Said WO publication also discloses a method for making the procatalyst composition, the steps of the method comprising: a) providing a liquid composition comprising i) a magnesium halide compound, ii) a solvent or diluent, iii) a transition metal compound wherein the transition metal is selected from the metals of Groups 3-10 and Lanthanides of the Periodic Table of the Elements, iv) optionally an internal electron donor, and v) further optionally a filler; b) spray-drying the composition to form a spray-dried particle; and c) collecting the resulting solid particles, characterized in that the magnesium halide compound forms a substantially saturated solution in the solvent or diluent. Said process is taught to provide an improved procatalyst with greater mechanical strength that results in reduced polymer fines while, at the same time, possessing good polymerization response and efficiency.

One type of catalyst or catalyst that is used in the UNIPOL process, namely UCAT J-25 brand catalyst, is a relatively brittle, hollow particle (pro)catalyst. As such, it is a fragile material that, depending on the percentage of particles that break during handling, may exhibit nonuniformity in particle size distribution (PSD). This variation in PSD can lead to undesirable variation in polymerization results. Visual methods of characterizing or determining the degree of bimodality, which is one measure of nonuniformity, may be unsatisfactory, as they tend to yield inconsistent results. Visual methods rely on a person looking at a PSD output and making a determination of the bimodality or unimodality of the PSD. A limitation of the visual method is that there are only three possible results; namely unimodal, bimodal or polymodal, whereas modality is a continuous function. A lot of information about the data is lost using the visual method. One drawback associated with the visual method is that it is subject to differing interpretations depending on the person reviewing the results. Thus, there is intrinsic uncertainty in relying on visual interpretation. Often times, false positives and negatives occur. These are situations in which the visual determination is erroneous.

For example, small, but noticeable, second peaks may lead to a batch of catalyst being categorized as "bimodal," but in some cases these catalysts are in fact suitable for use in making plastic resin of the desired quality. Wide "shoulders" are actually two peaks so close to each other that no trough exists between them, and these batches will, in fact, impact final plastic resin quality. However, without a noticeable trough, these will be labeled "unimodal" or "shoulder" using the visual method. Knapp, T. R., discusses bimodality and methods of determining it in his article "Bimodality Revisited" in the *Journal of Modern Applied Statistical Methods*, Vol. 6, Issue 1 (2007).

It would be desirable to have an improved method of characterizing the PSD of nonuniform particulate solids. One application of such a method could be an improved method of screening batches of catalyst for their suitability for use in polymerization.

SUMMARY

The method of the disclosure is such an improved method comprising, for a PSD of a plurality of particles of a nonuniform solid phase material, wherein the PSD is for a group of particles having a volume percent equal to 100 vol %, removing a top volume percentage and a bottom volume percentage from PSD to obtain a true PSD. Surprisingly, this method may be employed to identify batches of catalyst that are more effective for polyethylene polymerization.

DETAILED DESCRIPTION

Figure 1:
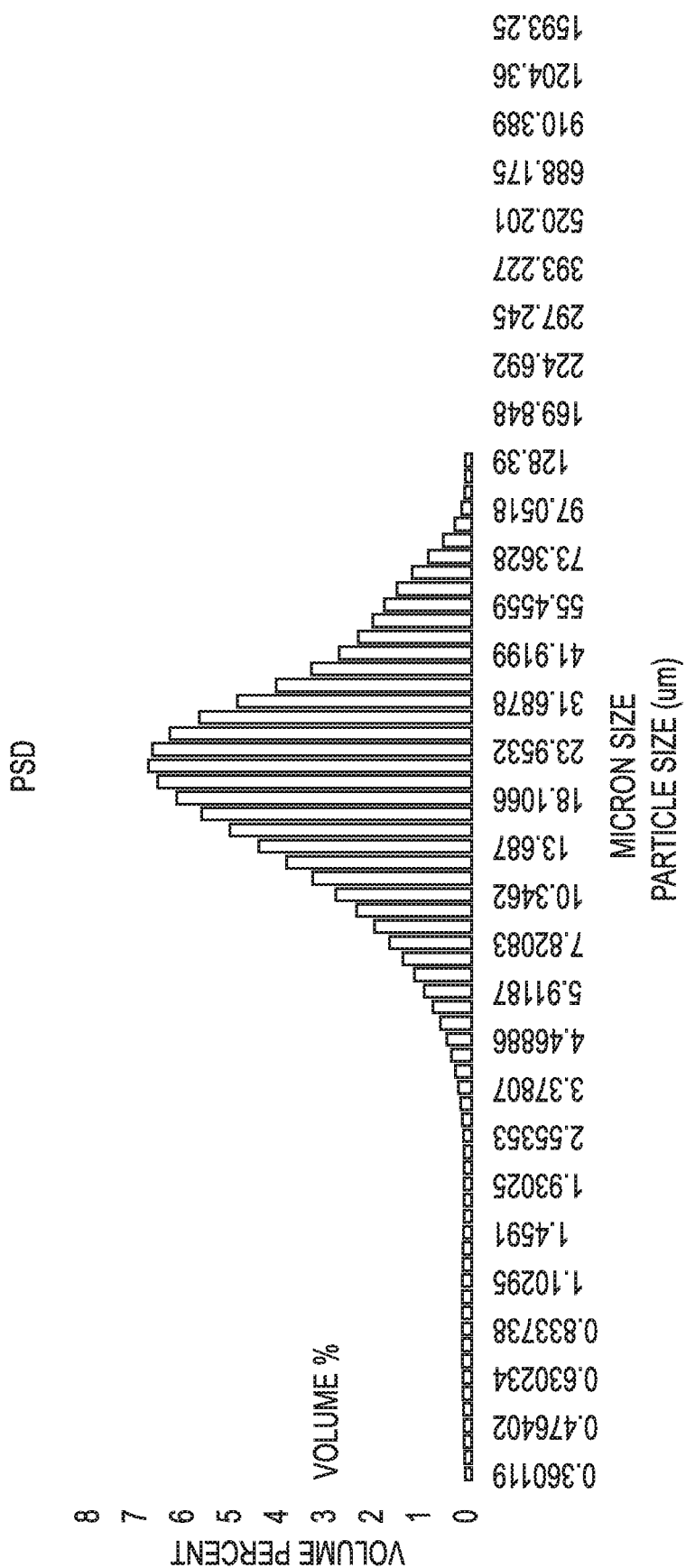
FIGS. 1 through 4 show catalyst particle size distribution curves.

In one embodiment, the method of the disclosure is an analytical method for determining the degree of bimodality, or unimodality, of a set of particles. In one embodiment, the result of the method is a number, called the Z-factor, representing that degree.

The method of the disclosure may be applied to a nonuniform solid phase material comprising a plurality of particles. In one embodiment, the particles are inorganic. In one embodiment, the particles comprise a catalytic material. In one embodiment, the particles comprise a catalyst composition. The particulate solid phase material may comprise hollow particles, nonhollow particles, or a mixture thereof.

Before the present compounds, components, compositions, resins, and/or methods are disclosed and described, it is to be understood that unless otherwise indicated this disclosure is not limited to specific compounds, components, compositions, resins, reactants, reaction conditions, ligands, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of," if used, excludes any component, step or procedure not specifically delineated or listed. The term "or," unless stated otherwise, refers to the listed members individually as well as in any combination.

The term "polyethylene" may refer to a polymer or polymeric resin or composition made of at least 50% ethylene-derived units, or at least 70% ethylene-derived units, or at least 80% ethylene-derived units, or at least 90% ethylene-derived units, or at least 95% ethylene-derived units, or even 100% ethylene-derived units. The polyethylene may thus be a homopolymer or a copolymer, including a terpolymer, having other monomeric units. A polyethylene resin described herein may, for example, include at least one or more other olefin(s) and/or comonomers. Illustrative comonomers may include alpha-olefins including, but not limited to, propylene, 1-butene, 1-pentene, 1-hexene, 1-octene, 1-decene and 4-methyl-1-pentene. Other monomers may include ethacrylate or methacrylate monomers.

In physical and organic chemistry, "dispersity" or "polydispersity" is a measure of the heterogeneity of sizes of molecules or particles in a mixture. As used herein, the term "dispersity" refers to the heterogeneity of sizes of particles in a mixture. A collection of objects is called uniform if the objects have the same size. A sample of objects that have an inconsistent size distribution is called nonuniform.

The terms "$D_{10}$", "$D_{50}$" and "$D_{90}$" are employed to indicate the respective percentiles of log normal particle size distribution determined, for example, by means of an automated particle size analyzer, such as a Coulter™ brand particle analyzer, using dodecane solvent. Thus, particles having a $D_{50}$ of 12 microns have a median particle size of 12 microns. A $D_{90}$ of 18 microns indicates that 90 percent of the particles have a particle size of less than 18 microns, and a $D_{10}$ of 8 microns indicates that 10 percent of the particles have a particle size of less than 8 microns. The width or narrowness of a particle size distribution can be given by its span. The span is defined as $(D_{90}-D_{10})/(D_{50})$.

The term "polymerization modifier" as used herein refers to a compound added to the catalyst composition or to the polymerization mixture in order to modify one or more process or product properties. Examples include selectivity control agents used to modify tacticity and crystallinity of the polymer, as well as activity control agents added to reduce catalyst activity at elevated temperatures thereby preventing run away reactions or polymer agglomerate formation and operability problems.

By the term "substantially saturated" is meant that the magnesium compound, especially a magnesium halide compound, forms a solution in the diluent or solvent that is highly concentrated and may even exceed the normal solution concentration limits of the diluent or solvent at the temperature of the atomization.

A histogram is a diagram consisting of rectangles whose area is proportional to the frequency of a variable and whose width is equal to the class interval. A histogram is an accurate graphical representation of the distribution of numerical data. It is an estimate of the probability distribution of a continuous variable (quantitative variable). It is a kind of bar graph. To construct a histogram, the first step is to "bin" the range of values, that is, divide the entire range of values into a series of intervals, and then count how many values fall into each interval. The bins are usually specified as consecutive, non-overlapping intervals of a variable. The bins (intervals) must be adjacent, and are often (but are not required to be) of equal size. If the bins are of equal size, a rectangle is erected over the bin with height proportional to the frequency, i.e. the number of cases in each bin. A histogram may also be normalized to display "relative" frequencies. It then shows the proportion of cases that fall into each of several categories, with the sum of the heights equaling 1. However, bins need not be of equal width; in that case, the erected rectangle is defined to have its area proportional to the frequency of cases in the bin. The vertical axis is then not the frequency but frequency density, i.e. the number of cases per unit of the variable on the horizontal axis. As the adjacent bins leave no gaps, the rectangles of a histogram touch each other to indicate that the original variable is continuous. Histograms give a rough sense of the density of the underlying distribution of the data, and often for density estimation: estimating the probability density function of the underlying variable. The total area of a histogram used for probability density is always normalized to 1. If the length of the intervals on the x-axis are all 1, then a histogram is identical to a relative frequency plot.

The term "kurtosis" is a measure of the "tailedness" of the probability distribution of a real-valued variable. Kurtosis is a descriptor of the shape of a probability distribution and there are different ways of quantifying it for a theoretical distribution and corresponding ways of estimating it from a sample from a population. Depending on the particular measure of kurtosis that is used, there are various interpretations of kurtosis, and of how particular measures should be interpreted.

The standard measure of kurtosis is based on a scaled version of the fourth moment of the data or population. This $$\text{Skewness} = \frac{\sum_{i=1}^{N}(Y_i - \overline{Y})^3}{N \cdot s^3}$$

number is related to the tails of the distribution, not its peak. For this measure, higher kurtosis is the result of infrequent extreme deviations (or outliers), as opposed to frequent modestly sized deviations.

The kurtosis of any univariate normal distribution is 3. It is common to compare the kurtosis of a distribution to this value. Distributions with kurtosis of less than 3 are said to be platykurtic, although this does not imply the distribution is "flat-topped." Rather, it means the distribution produces fewer and less extreme outliers than does the normal distribution. An example of a platykurtic distribution is the uniform, or Gaussian, distribution, which does not produce outliers. Distributions with kurtosis greater than 3 are said to be leptokurtic. An example of a leptokurtic distribution is the Laplace distribution, which has tails that asymptotically approach zero more slowly than a Gaussian, and therefore produces more outliers than the normal distribution.

For the purposes of this disclosure, kurtosis is determined as follows.

$$\text{Kurtosis} = \frac{\sum_{i=1}^{N}(Y_i - \overline{Y})^4}{N \cdot s^4}$$

where Y is the volume percent of particles in a given "bin," $\overline{Y}$ is the mean; s is the standard deviation and N is the total number of "bins." For the purposes of this disclosure, a "bin" is a subrange of the PSD, as described above. For example, if $N_{10}$ represents the bin from 1 um to less than 2 um, then $Y_{10}$ represents the volume % of all particles with diameter from 1 um to less than 2 um. In one embodiment, the number and the size range of a bin is determined by the particle size analyzer employed.

Skewness is a measure of the asymmetry of the probability distribution of a real-valued variable about its mean. The skewness value can be positive or negative, or undefined. The qualitative interpretation of the skew is complicated and unintuitive. Skew does not refer to the direction the curve appears to be leaning; in fact, the opposite is true. For a unimodal distribution, negative skew indicates that the tail on the left side of the probability density function is longer or fatter than the right side, but it does not distinguish these two kinds of shape. Conversely, positive skew indicates that the tail on the right side is longer or fatter than the left side. In cases where one tail is long but the other tail is fat, skewness does not obey a simple rule. For example, a zero value means that the tails on both sides of the mean balance out overall; this is the case for a symmetric distribution, but is also true for an asymmetric distribution where the asymmetries even out, such as one tail being long but thin, and the other being short but fat.

For the purposes of this disclosure, skewness is determined as follows.

$$\text{Skewness} = \frac{\sum_{i=1}^{N}(Y_i - \overline{Y})^3}{N \cdot s^3}$$

where Y, $\overline{Y}$; s and N are as defined above.

For the purposes of the disclosure, a numerical value can be assigned to bimodality by determining the kurtosis of a PSD and the skewness of a PSD and performing the following calculation: Kurtosis minus the square of the Skewness (Kurtosis-Skewness$^2$). When this calculation is performed in the classic manner, i.e. over the full range of a PSD, the result is referred to herein as "full range bimodality."

For the purposes of this disclosure, "modality" refers to the polydispersity of a particle size distribution. In one embodiment, modality refers specifically to PSDs that are unimodal or bimodal.

For the purposes of the disclosure, the term "Z factor" is a numerical value representing the modality of the particle size distribution of a particulate solid material. The Z-factor can be calculated using the following equation: Z-factor=Kurtosis-Skewness of the true particle size distribution. The Z-factor numerically characterizes the modality, i.e. unimodality or bimodality, of the particle size distribution of a particulate solid.

For the purposes of the disclosure, the term "true particle size distribution" is determined by eliminating all nonsensical values from the full range of a PSD. The nonsensical values are those values attributed to the act of measuring the PSD, i.e. measurement artifacts. For example, the act of determining the PSD may result in the generation of fines, and may generate artificial high values due to, e.g. bubbles generated by the particle size analyzer. Attempting to quantify bimodality of particles without first excluding measurement artifacts, results in a large number of meaningless outliers that make it impossible to confidently categorize modality. In one embodiment, the true particle size distribution is determined by removing the bottom 2.5 volume percent and the top 0.5 volume percent from a PSD wherein the PSD represents 100 volume percent of the sample being analyzed.

Thus, the true particle size distribution is obtained by mathematically filtering (deleting) a top and a bottom portion from the particle size distribution. For example, in one embodiment, the true particle size distribution only includes particles whose diameters are from 3.86 um to 76.4 um, inclusive, (particles above 76.4 um and below 3.86 um are those that were filtered) In other words, the PSD of the particulate material with diameter between 3.86 um and 76.4 um is considered the true particle size distribution of that material.

In one embodiment, the following steps can be taken to determine the true particle size distribution and Z-factor:

1) Take multiple samples from multiple batches of the particulate material in question and generate PSD histogram data for them all.

2) Review the PSD histograms and select the one most representative of a normal Gaussian distribution.

3) Mathematically filter (delete) the bottom 2.5 volume % and the top 0.5 volume % of the selected histogram. What remains is a "Filtered PSD histogram." representing the true particle size distribution.

4) Calculate the micron range that particles within the filtered PSD histogram falls in between. In other words, determine the diameter of the smallest particle and the largest particle in the filtered PSD histogram.

5) Return to the set of PSD histograms for all the samples that were generated in step 2) and delete all data outside the size range as defined in step 4). What remains is a filtered PSD histogram for every sample, which represents each sample's true particle size distribution. Note: the same size range, as specified in step 4), is used for all samples. Do not apply step 3) to every PSD, it is only done once with the sample closest to the normal, or Gaussian, distribution.

6) Calculate the Z-factor, i.e. kurtosis-skewness', for every true particle size distribution. This gives the Z-factor for each respective sample.

The preceding method may be modified as desired by generating histograms for less than all of the samples, and/or by reviewing less than all of the histograms, and/or by taking a single sample as opposed to multiple samples. It may also be varied by filtering the histograms to remove other than the bottom 2.5 vol. % and/or other than the top 0.5 vol. %, and/or by filtering only the top or the bottom and not both.

The value of the cut off points for mathematically filtering the histograms may be varied to suit the material being analyzed and the analytical method employed. In one embodiment, the bottom volume % may be less than or equal to 2.5%, or less than or equal to 2%, or less than or equal to 1.5% or less than or equal to 1%, and the top volume % of a selected histogram may be less than or equal to 1%, or less than or equal to 0.75%, or less than or equal to 0.5% or less than or equal to 0.25%.

In one embodiment, selecting relevant true data, or the true PSD, involves three steps:

1) Take a measurement of the particle size distribution;
2) from that PSD measurement, eliminate fines readings; these represent sample attrition due to, e.g., handling while measuring PSD; and
3) eliminate large micron readings that are beyond the capability of the catalyst manufacturing process; these represent noise generated by the measurement device.

Following the above steps generates a Z-factor value for every sample. This Z-factor effectively describes the level of bimodality quantitatively. Higher values are more unimodal, with a value of 3 representing a normal, or Gaussian, distribution. Lower values, around 2, represent significant bimodality. Values in between, from roughly 2.3 to 2.6, will represent "shoulders," in other words, transitional distributions.

The "Z-factor" may be used to select desirable batches of catalyst from a plurality of batches of catalyst. Advantageously, the solid particulate material has a Z-factor of at least 2.7, preferably has a Z-factor of at least 2.8, or more preferably has a Z-factor of at least 2.9.

In one embodiment, the disclosure includes a method for characterizing the particle size distribution of a nonuniform particulate solid material having a distribution of particle size values, the method comprising (a) providing samples comprising a plurality of particles of the particulate solid material; (b) measuring the particle size distribution of the samples of the particulate solid material and generating histograms for the samples, (c) reviewing the histograms of the samples and selecting one that has a PSD closest to a normal Gaussian PSD, then mathematically filtering (delete) all particle sizes that are in the bottom 2.5 volume % of the material and the top 0.5 volume % of the material from this histogram to obtain a "true PSD histogram" (d) calculating the micron range of the true PSD histogram, i.e. the micron size range from the diameter of the smallest particle to the micron size range of the diameter of the largest particle of the remaining 97% of the material and (e) for all samples, calculating a value equal to the kurtosis minus the square of the skewness for the PSD histograms generated in step (b) only considering particles whose diameter falls in the micron range defined in step (d). This value is defined as the Z-factor, which numerically characterizes the modality, i.e. unimodality or bimodality, of the particle size distribution of the particulate solid. This method may comprise a further step comprising recording the particle size distribution measurement, wherein the mathematically removing is done on the recorded particle size distribution measurement.

A preferred catalyst composition for ethylene polymerizations comprises $TiCl_3$, formed by the reduction of $TiCl_4$ with magnesium metal in the presence of an electron donor. The electron donor employed in this embodiment must be free of substituents containing active hydrogen, such as hydroxyl groups, as such functional groups readily react with both magnesium and titanium tetrachloride. The reduction process results in the formation of a mixture of magnesium dichloride and titanium trichloride, in the form or a complex with the electron donor. This reaction can be illustrated by the following equation: $2\ TiCl_4(ED)_2 + Mg \sim 2\ TiCl_3(ED)_3 + MgCl_2(ED)_{1.5}$, where ED is a Lewis base electron donor, preferably tetrahydrofuran. WO 2006/023057 contains additional information regarding examples of suitable procatalysts, and the teachings of WO 2006/023057 regarding procatalysts, their preparation and use are incorporated herein by reference.

In one embodiment, the solid phase material comprises substantially spheroidal shaped particles of a magnesium halide-containing catalyst composition, said particles having an average size (D50) of from 10 to 70 microns, preferably 15 to 50 microns, and most preferably from 20 to 35 microns, and comprising at least 5 percent, preferably at least 20 percent and most preferably at least 25 percent of particles having substantial internal void volume and a substantially monolithic surface layer (shell), characterized by an average shell thickness/particle size ratio (Thickness Ratio) determined by SEM techniques for particles having particle size greater than 30 microns of greater than 0.2, preferably greater than 0.25.

Additional components of the catalyst composition may include fillers, binding agents, solvents, polymerization modifiers, and the aforementioned electron donor. Typically a liquid mixture in which the magnesium halide composition is soluble is contacted with the filler, especially finely particulated, substantially spheroidal shaped silica. The term "substantially spheroidal" as used herein means particles having an average aspect ratio from 1.0 to 2.0, where aspect ratio is defined as the ratio of the largest linear dimension of a particle to the smallest linear dimension thereof as determined from Scanning Electron Micrograph (SEM) images. Preferred fillers have an average particle size ranging from 0.01 micron to 12 microns. Larger sized filler particles do not pack as densely as smaller particles leaving inter-particle voids in the resulting dried particles, in which the catalyst composition and/or binders are inserted. A sufficient amount of catalyst composition and optional binder should be used to fill any voids between filler particles, resulting in the formation of a relatively dense, tough and shatter resistant shell on the surface of the catalyst particle.

Various methods of making catalyst compositions are known in the art. In a preferred method, the preparation involves chlorination of a magnesium compound or mixture of compounds, optionally: in the presence of an inert solid material, or filler, especially silica, alumina, an aluminosilicate, or similar substance. The resulting compound or complex comprises at least magnesium, halogen, and transition metal moieties, especially titanium or vanadium moieties.

Suitable fillers are inert to the other components of the catalyst composition, and to the active components employed in any subsequent polymerization. Suitable compounds can be organic or inorganic and include, but are not limited to, silicas, titanium dioxide, zinc oxide, magnesium carbonate, magnesium oxide, carbon, and calcium carbonate. In some embodiments, the filler is fumed hydrophobic silica that imparts relatively high viscosity to the slurry and good strength to the spray-dried particles. In other embodiments, two or more fillers may be used. Suitable fillers for use herein include those sold under the trade designation Gasil™, available from Ineos Corporation, and Cabosil™, available from Cabot Corporation.

The filler may be porous or nonporous. Nonporous fillers, such as fumed silicas, fumed aluminas, and fumed titanias are generally of very small particle size, typically with primary particle sizes less than 0.1 microns, although materials in the form of aggregates of the primary particle, may be employed as well.

When the solid phase particle comprises a hollow catalyst particle, then preferably the relatively empty regions of the particle interior constituting the center half of the particle's interior volume comprise no more than 20 percent, more preferably no more than 10 percent, of the particle's mass. For some materials, such as UCAT J-25, PSD bimodality is an indication of fragmentation of the friable, hollow (pro) catalyst particles. UCAT J-25 products that have a large amount of this fragmentation will polymerize ethylene into polyethylene of irregular, nonspherical, shape. These polyethylene products will have lower resin settled bulk density compared to polyethylene prepared using UCAT J-25 (pro) catalysts that have unimodal PSD. Therefore, bimodal UCAT J-25 is an inferior product. To complicate this issue, PSD bimodality does not affect the D50 (median) of the PSD, and D50 is a typical quality control measurement the polyethylene catalyst industry uses to qualify PSDs. Thus, without a proper way to detect and quantitatively measure bimodality, it is very easy for bimodal UCAT J-25 (pro) catalyst to pass undetected through the quality control process. Advantageously, (pro)catalyst to be employed in the manufacture of polyethylene has a Z-factor of at least 2.7.

Polymerization

For the purposes of this disclosure, a "procatalyst" is a particle containing a catalytic metal, e.g. Ti. For example, in the polymerization of ethylene, it is often true that the spray dried "catalyst" particle is not really a catalyst as it will not polymerize ethylene by itself. It needs an activating agent, e.g. an aluminum alkyl activating agent, and perhaps other components, as known to those skilled in the art, to become a catalyst. However, as used herein the term "catalyst" refers interchangeably to both catalysts and procatalysts.

The method of the disclosure may advantageously be employed to characterize the unimodal or bimodal nature of catalyst batches and to select catalyst batches for use in polymerization. In one embodiment, the method of this disclosure advantageously is applied to catalysts that are spray dried; for example, use of a concentrated slurry and rapid drying conditions results in the formation of hollow particles, as is described in WO 2006/023057. In one embodiment, the method of this disclosure advantageously is applied to solid phase catalyst particles that are friable and hollow.

The UNIPOL process is an example of an industrial catalytic polymerization process. Examples of catalysts useful in the UNIPOL process include UCAT™ A, UCAT™ B, UCAT™ G, and UCAT™ J catalysts, ACCLAIM™ K-100 series catalysts, and XCAT™ metallocene catalysts, including XCAT™ HP-100 Catalyst; and XCAT™ EZ-100 catalyst, and PRODIGY™ catalysts. In one embodiment, the catalytic material comprises a Group 4 metal salt deposited on a particulate filler, wherein the Group 4 metal salt is $TiCl_3$.

In one embodiment, the catalyst is prepared by spray-drying a catalytic material on a fumed silica filler, with a target median particle size of 25 um.

The following specific embodiments of the disclosure are especially desirable and hereby delineated in order to provide specific disclosure for the appended claims.

1. A method comprising, for a PSD of a plurality of particles of a nonuniform solid phase material, wherein the PSD is for a group of particles having a volume percent equal to 100 vol %, removing a top volume percentage and a bottom volume percentage from PSD to obtain a true PSD.

2. The method of claim 1 further comprising calculating a numerical value representing the modality of the true PSD, wherein the numerical value is calculated using the equation Z equals kurtosis minus the square of the skewness, wherein the kurtosis and the skewness are calculated for the true PSD.

3. The method of any one of the preceding claims wherein the top volume percentage comprises the particles in at least the highest 0.5 vol % of the particles of the PSD and the bottom volume percentage comprises the particles in at least the lowest 2.5 vol % of the particles of the PSD.

4. The method of any one of the preceding claims wherein the particulate solid phase material has a PSD that is unimodal or bimodal.

5. The method of any one of the preceding claims wherein the particulate solid phase material comprises an inorganic material.

6. The method of any one of the preceding claims wherein the particulate solid phase material comprises a catalyst.

7. The method of any one of the preceding claims wherein the material comprises a catalytic material spray-dried on a particulate solid phase filler.

8. The method any one of the preceding claims further comprising selecting the particulate solid phase material for use in a manufacturing process for making a manufactured product, wherein the suitability of the particulate solid for use in the manufacturing process is based on the Z-factor.

9. The method of any one of the preceding claims wherein the Z-factor value of the particles is at least 2.7, or at least 2.8 or at least 2.9.

10. The method of claim 8 wherein the particulate solid comprises a Ziegler-Natta catalyst spray-dried on a particulate solid phase filler, the manufacturing process comprises polymerizing ethylene or copolymerizing ethylene and an alpha-olefin in the presence of the catalyst in a gas phase fluidized bed reactor.

SPECIFIC EMBODIMENTS

It is to be understood that while the present disclosure has been described in conjunction with the specific embodiments thereof, the foregoing description is intended to illustrate and not limit the scope of the disclosure. Other aspects, advantages and modifications will be apparent to those skilled in the art to which the disclosure pertains. Therefore, the following examples are put forth so as to provide those skilled in the art with a complete disclosure and description of how to make and use the disclosed resins, and are not intended to limit the scope of the disclosure.

Visual Test Method

Batches of UCAT J-25 catalyst, which is commercially available from Univation Technologies, LLC, are tested using the following visual method. A catalyst sample is analyzed using a LS 13 320 Laser Diffraction Particle Size Analyzer, available from Beckman Coulter. A PSD is determined by the analyzer and a result histogram is printed. The histogram is reviewed visually and is characterized as "unimodal," "bimodal," or "shoulder," where shoulder is somewhere in between unimodal and bimodal.

Z-Factor Method

The procedure is initially the same as that of the visual test. The sample is analyzed in the analyzer. Then, the raw histogram data is manipulated by removing the tails, as described hereinbelow to produce a truncated data set. Then, the data set is used to generate a Z-factor value by using the Z-factor equation shown hereinabove.

Examples 1 to 4

Characterization of Samples Using Z-Factor Method vs. Visual Method

Four different samples of UCAT J-25 catalyst are each subjected to both the visual test method and the Z-factor Method. The results are shown in FIGS. 1 to 4, which show four catalyst particle size distribution curves of decreasing Z-factor. These figures are generated by recording the histogram data into a spreadsheet, followed by plotting the average values for each bin.

For FIG. 1, the graph is unimodal by the visual test method, and the Z-factor is 2.97, also indicating unimodality.

Figure 2:
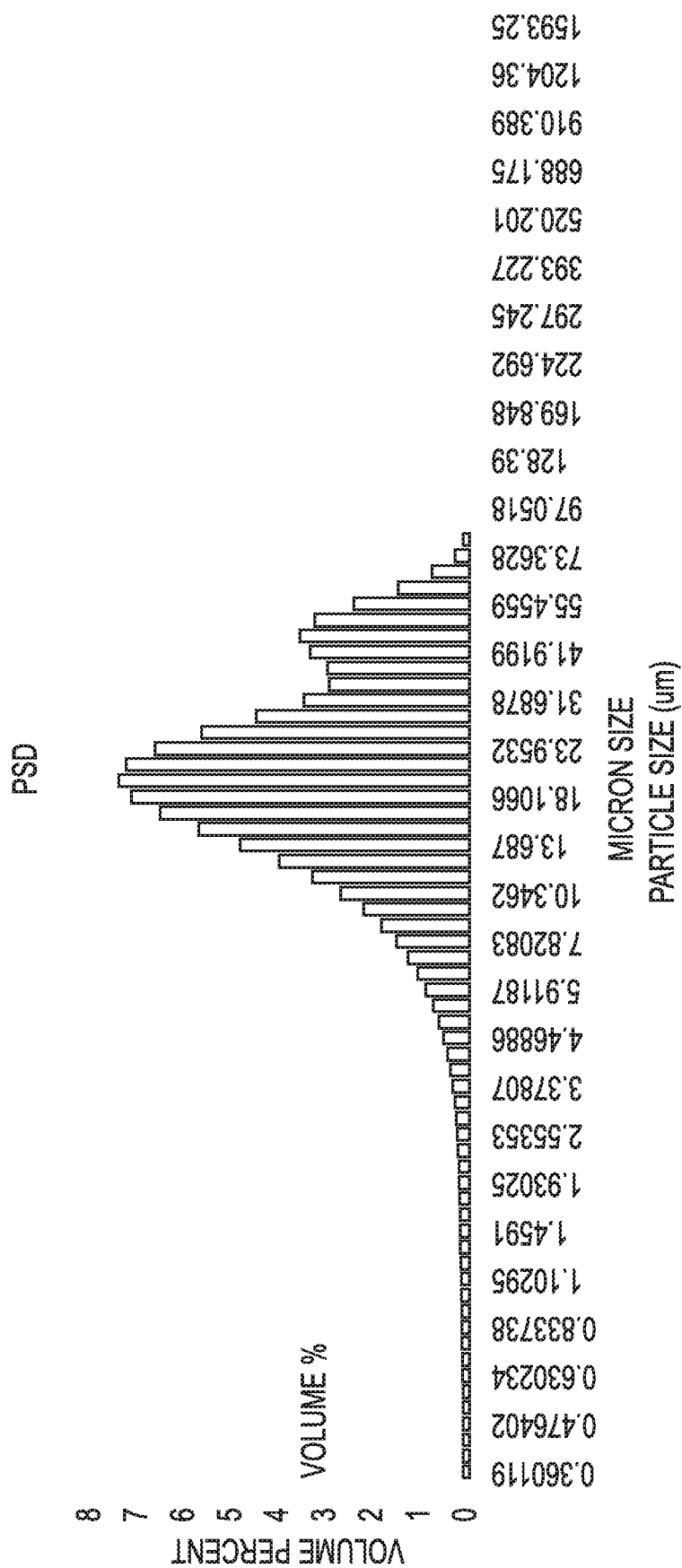

For FIG. 2, the graph is bimodal, showing 2 peaks, by the visual test method, and the Z-factor is 2.50.

Figure 3:
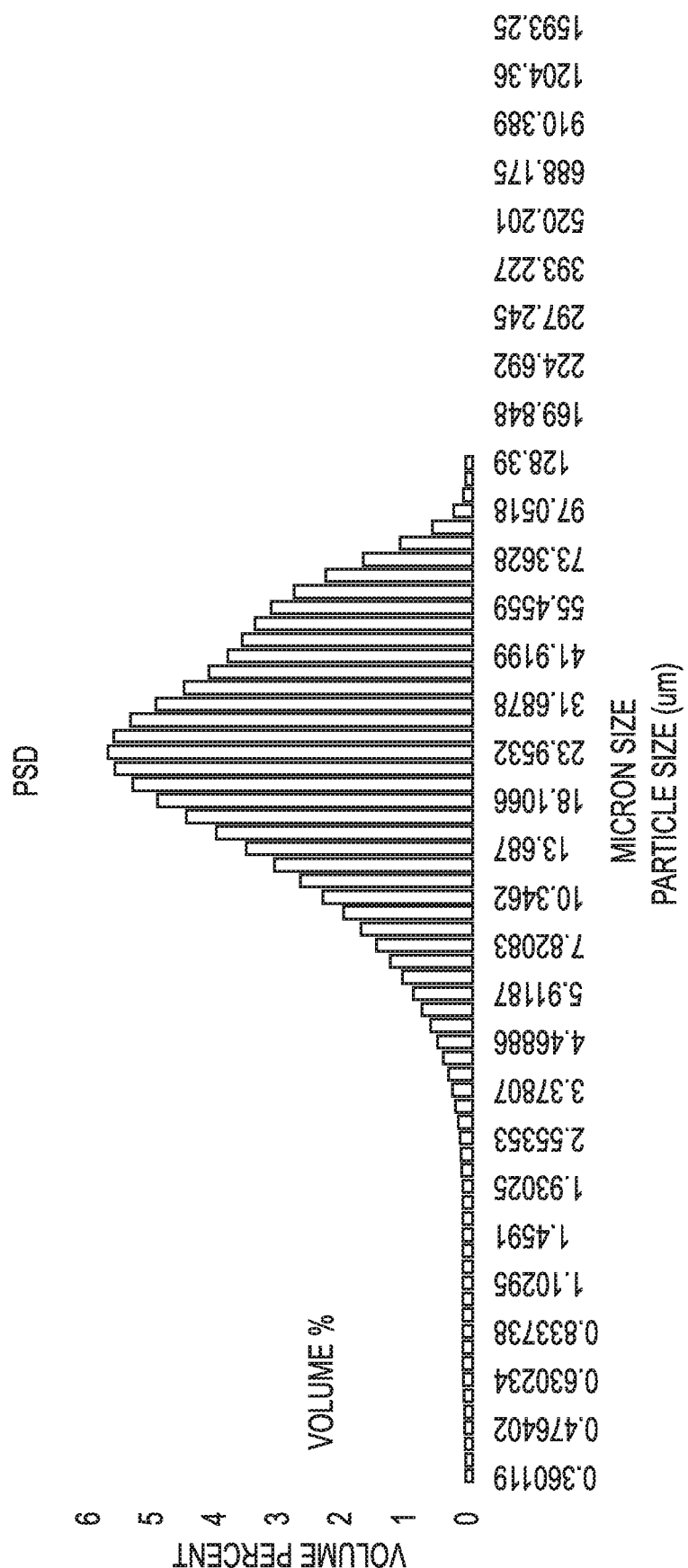

For FIG. 3, the graph is unimodal by the visual test method, and the Z-factor is 2.31.

For FIG. 2, the graph is bimodal, showing 2 peaks, by the visual test method, and the Z-factor is 2.13.

Figure 4:
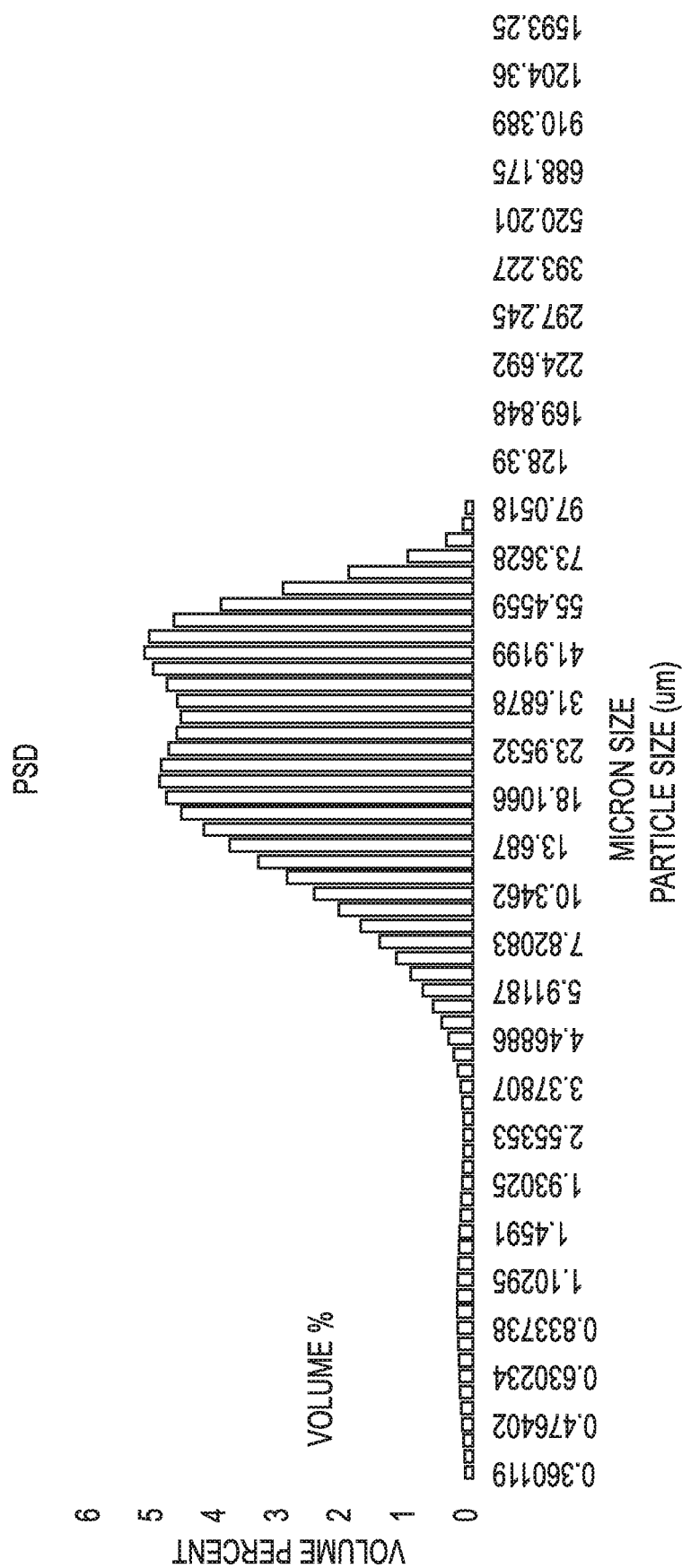

FIG. 1 shows a normal distribution and this catalyst will normally result in high quality resin properties. It has a high Z-factor of 2.97 which corresponds well with the visual method. Similarly, FIG. 4 is a very bimodal distribution, with a low Z-factor of 2.13. This catalyst will normally result in poor quality resin properties. Visually, this is clearly bimodal and again the two tests correspond well. FIGS. 2 and 3 show distributions in which the Z-factor method is superior. FIG. 2 is visually bimodal and FIG. 3 is visually unimodal, yet the Z-factor for FIG. 2 is higher than that of FIG. 3, namely 2.5 vs. 2.3. This indicates that the PSD of FIG. 2 is less bimodal than that of FIG. 3, and will have a smaller impact on final resin quality. The reason lies in the size and proximity of the second peak. In FIG. 2, there is only a small second peak, making its impact on final catalyst and polyethylene quality small as well. In FIG. 3, there are actually two peaks, but they are very close together, so much so that it visually appears as a single elongated peak: Thus, it can be seen from FIGS. 1-4, that using the Z-factor to characterize a batch of catalyst particles eliminates the shortcomings of the visual test method described hereinabove.

Because FIG. 3's second peak is more pronounced than FIG. 2's, it is quantified by a lower Z-factor. Thus, it actually will have poorer resin quality compared to the catalyst depicted in FIG. 2, despite being visually "unimodal." In other words, using the visual test, this catalyst product will have passed quality review as "good" even though it is at risk, but, as mentioned above, the Z-factor test is able to more accurately determine the polydispersity or modality of the sample.

These results show how the Z-factor method outperforms the visual test in detecting at-risk catalyst. Furthermore, because the result is quantitative, the data is easier to compile and statistically analyze. In addition, while the Z-factor may be calculated manually, the Z-factor test can take advantage of the use of an automated computational method, such as a spreadsheet, and therefore can take less time than the visual test method. Additionally, the Z-factor test method is consistent regardless of who reviews the data. These benefits make the Z-factor test superior to the visual test.

Example 5, and Comparative Experiment A: Z-Factor Bimodality Testing vs. Full Range Bimodality Testing Samples of UCAT J are studied to determine true particle size distribution via the Z-factor and show the superiority of the Z-factor method over applying Kurtosis-Skewness' over the full PSD range. To start, a large number of UCAT J samples are analyzed using a LS 13 320 Laser Diffraction Particle Size Analyzer, available from Beckman Coulter to provide a data set. Applying Kurtosis-Skewness' over the full range for this data set is straightforward and provides control data (Comparative Experiment A). To determine the range for the true particle size distribution, in view of the fact that any readings above 75 micron are beyond the range of the manufacturing process, data over 75 microns is excluded from the data sets. Then, fines below 4 microns are excluded from the data sets. Therefore, PSD data between 4 microns and 75 microns is used as the range for the true PSD.

The Coulter analyzer separates PSD data into bins of micron ranges. To avoid estimating fractions of a bin, the nearest Coulter analyzer bin sizes to the selected true range are used. For this Coulter analyzer, the low end of the range then becomes 3.86 um and the high end becomes 76.4 um. Thus, for this example, the final Z-factor is defined as Kurtosis-Skewness measured between the range of 3.86 um and 76.4 um.

Figure 5:
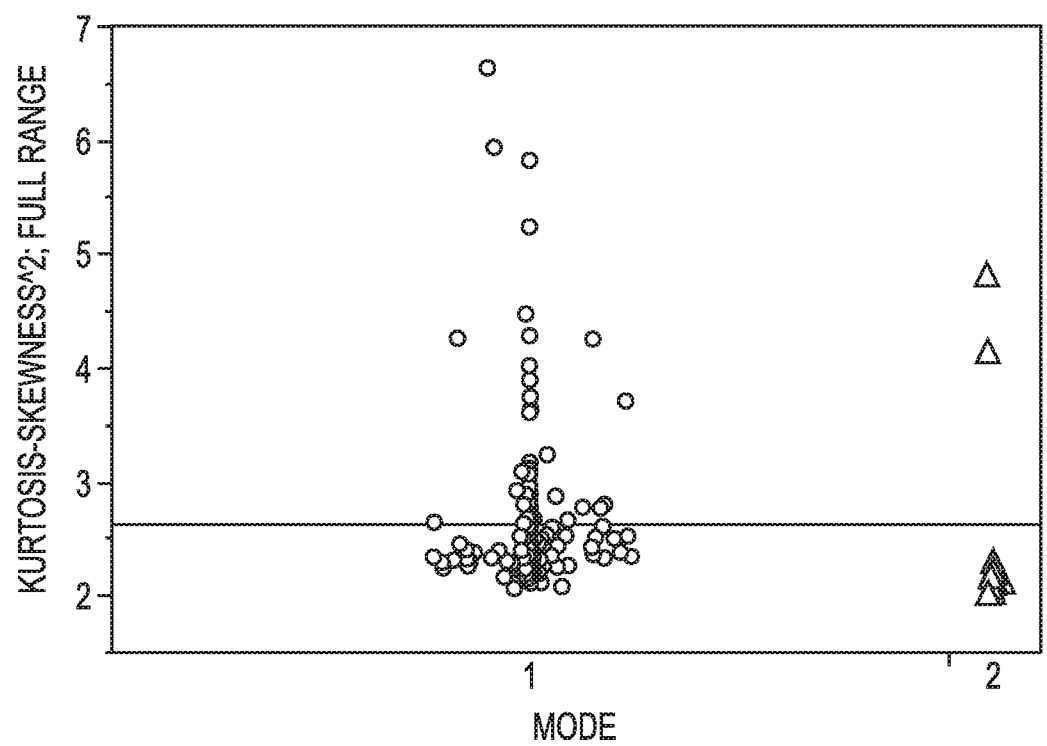
FIGS. 5 and 6 display kurtosis-skewness$^2$ data, i.e. Z-factor data, for unimodal and bimodal catalyst samples.
Figure 6:
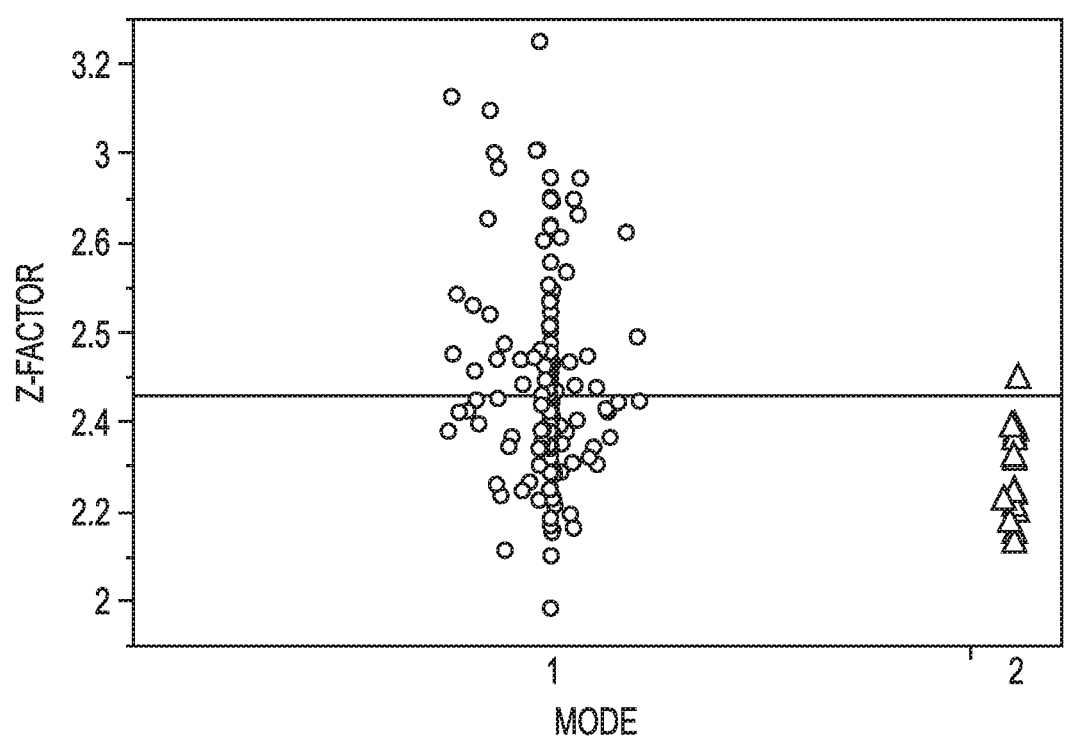

Example 5 employs the Z-factor while Comparative Experiment A does not. Plots of Comparative Experiment A results are shown in FIG. 5 and plots of Ex. 5 results for the same samples are shown in FIG. 6. FIGS. 5 and 6 display kurtosis and skewness data for unimodal and bimodal UCAT J catalyst samples. The data set employed is the same for both figures; FIG. 5 displays the results of measuring kurtosis-skewness over the full PSD data range for each sample, while FIG. 6 measures it only between 3.86 um and 76.4 um. The x-axis categorizes the data by modes, and is determined visually, i.e. the PSD of each sample is visually reviewed. The data in FIG. 5 is normalized so the median is the same as that of FIG. 6. Based on the visual review, unimodals are marked by circles and bimodals by triangles.

For a perfect normal distribution, kurtosis will equal 3 and skewness will equal 0. Thus, the bimodality test, whether full range or custom range, should result in a value of 3 for a normal or Gaussian PSD. Values near 3 are considered unimodal and are characteristic of catalyst that may be employed to make polymer with good properties. As the value goes down towards 2, greater and greater bimodality will occur, indicating that the use of a catalyst with such properties is more likely to result in poorer resin properties.

When the analysis is done over the full range, there are many outliers: a large number of samples are in the 4+ range. These are caused by the inclusion of machine artifacts. If one is to treat the data as "real," it would represent a single very sharp, low span peak, which represents something physically impossible for the catalyst manufacturing process to produce.

This highlights a critical failure of applying kurtosis-skewness$^2$ over the full range, namely false negatives. On the right side of FIG. 5 there are two visually bimodal samples with very high kurtosis-skewness scores. If quality control approves catalysts with traditionally measured kurtosis-skewness$^2$ values of 2.7 and above, these bimodal catalysts will pass the screening process. FIG. 6 shows that the Z-factor custom range process of this disclosure eliminates this problem entirely, as no extreme outliers remain, i.e. there are no data points in the "impossible to manufacture" range.

In one embodiment, the Z-factor is defined as Kurtosis-Skewness$^2$ measured between the range of 3.86 um and 76.4 um, inclusive, the particulate solid phase material comprises a catalyst spray-dried on a fumed silica filler, with a median particle size of 25 um plus or minus 1 micron, and the particle size distribution is determined using a LS 13 320 Laser Diffraction Particle Size Analyzer.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present disclosure.

What is claimed is:

1. A method comprising,
providing a plurality of particles of a nonuniform solid phase material having a particle size distribution (PSD), wherein the PSD is for a group of particles having a volume percent equal to 100 vol % and wherein the plurality of particles of the nonuniform solid phase material include a catalyst;
removing from the group of particles a top volume percentage and a bottom volume percentage based on the PSD to obtain a true PSD;
calculating a Z-factor which is a numerical value representing the modality of the true PSD, wherein the Z-factor is calculated using the equation Z-factor=Kurtosis−Skewness$^2$, wherein the Kurtosis and the Skewness are calculated for the true PSD; and
polymerizing ethylene or copolymerizing ethylene and an alpha-olefin with the plurality of particles of the non-uniform solid phase material that include the catalyst, wherein the Z-factor for the plurality of particles of the nonuniform solid phase material that include the catalyst is at least 2.7.

2. The method of claim 1, wherein the top volume percentage comprises the particles in at least the highest 0.5 vol % of the plurality of particles of the nonuniform solid phase material and the bottom volume percentage comprises the particles in at least the lowest 2.5 vol % of the plurality of particles of the nonuniform solid phase material.

3. The method of claim 1, wherein the plurality of particles of the nonuniform solid phase material has a PSD that is unimodal or bimodal.

4. The method of claim 1, wherein the plurality of particles of the nonuniform solid phase material comprises an inorganic material.

5. The method of claim 1, further comprising selecting the plurality of particles of the nonuniform solid phase material for use in a manufacturing process for making a manufactured product, wherein the suitability of the plurality of particles of the nonuniform solid phase material for use in the manufacturing process is based on the Z-factor.

6. The method of claim 5, wherein the Z-factor value of the plurality of particles of the nonuniform solid phase material is at least 2.8 or at least 2.9.

7. The method of claim 5 wherein the catalyst comprises a Ziegler-Natta catalyst, the manufacturing process comprises polymerizing ethylene or copolymerizing ethylene and an alpha-olefin in the presence of the Ziegler-Natta catalyst in the gas phase fluidized bed reactor.

* * * * *